United States Patent

Andou et al.

[19]

[11] Patent Number: 5,952,079
[45] Date of Patent: Sep. 14, 1999

[54] CERAMIC HONEYCOMB STRUCTURE AND METHOD OF PRODUCTION THEREOF

[75] Inventors: Yosiyasu Andou; Yasunao Miura, both of Nagoya; Kazuyuki Ito, Nishio, all of Japan

[73] Assignee: Denso Corporation, Kariya, Japan

[21] Appl. No.: 09/051,232

[22] PCT Filed: Aug. 7, 1997

[86] PCT No.: PCT/JP97/02767

§ 371 Date: Sep. 4, 1998

§ 102(e) Date: Sep. 4, 1998

[87] PCT Pub. No.: WO98/05602

PCT Pub. Date: Feb. 12, 1998

[30] Foreign Application Priority Data

Aug. 7, 1996 [JP] Japan .................................... 8-208082

[51] Int. Cl.$^6$ .................................................. B32B 17/00
[52] U.S. Cl. ..................... 428/116; 422/180; 502/439; 502/527.19; 210/500.21; 210/506; 264/433
[58] Field of Search ............................ 422/180; 428/116; 502/439, 527.19; 210/500.21, 506; 244/133; 264/433

[56] References Cited

U.S. PATENT DOCUMENTS 4,448,833  5/1984  Yamaguchi ............................. 428/116
4,550,005  10/1985  Kato ...................................... 264/177 R

*Primary Examiner*—Timothy Speer
*Attorney, Agent, or Firm*—Pillsbury Madison & Sutro LLP

[57] ABSTRACT

The present invention discloses a ceramic honeycomb structure comprising partition walls 3 that form mutually adjacent flow paths having a polygonal cross-section, and a peripheral wall 5 provided around the circumference of partition walls that hold the partition walls integrated into a single unit; wherein, the mean thickness of partition walls 3 is 0.05 mm to 0.13 mm, the mean thickness of peripheral wall 5 is greater than the mean thickness of partition walls 3, and the mean contact width between partition walls 3 and peripheral wall 5 satisfies a predetermined relationship. This ceramic honeycomb structure is able to inhibit the occurrence of chipping in the vicinity of the peripheral wall.

18 Claims, 13 Drawing Sheets

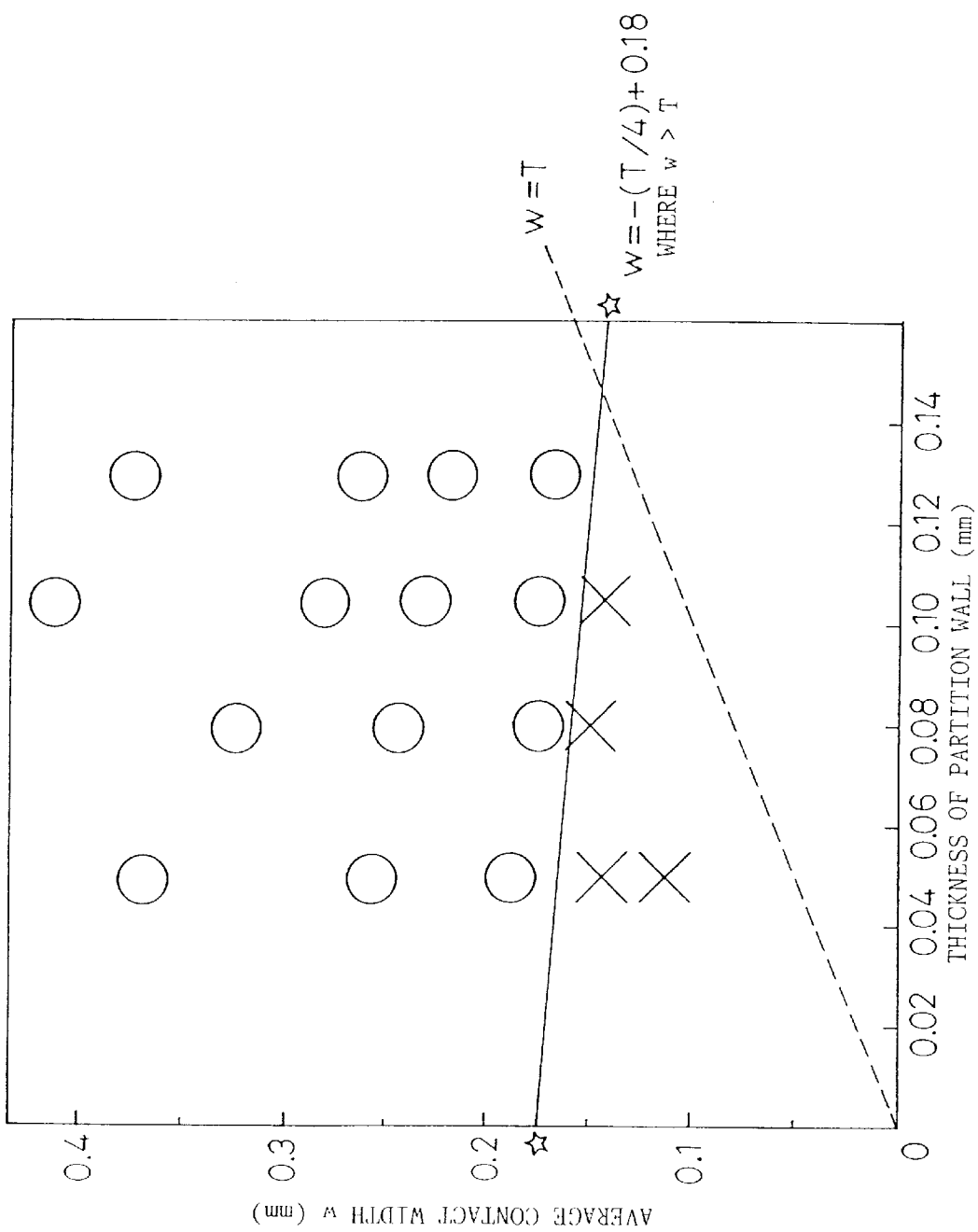

CERAMIC HONEYCOMB STRUCTURE AND METHOD OF PRODUCTION THEREOF

This application is the national phase of international application PCT/JP97/02767 filed Aug. 7, 1997 which designated the U.S.

TECHNICAL FIELD

The present invention relates to a ceramic honeycomb structure (hereinafter referred to simply as the honeycomb structure) and its manufacturing method, and more particularly, to a ceramic honeycomb structure and its manufacturing method that is used in catalyst supports for internal combustion engines, filters and so forth.

BACKGROUND ART

For example, honeycomb structures used as catalyst supports for internal combustion engines have in recent years come to be required to have low pressure loss accompanying the increased performance of internal combustion engines, as well as high purification performance in consideration of environmental issues and so forth.

As can be seen in Japanese Unexamined Patent Publication (Kokai) No. 7-39761, in the prior art, attempts have been made to maintain compression strength while maintaining a low thickness for the partition walls that compose the honeycomb structure by using predetermined values for numerical aperture, bulk density and so forth.

However, it was still difficult to obtain a honeycomb structure free of chipping in the constitution of the prior art.

Therefore, the present invention was obtained in consideration of the above-mentioned problems, and is characterized by the obtaining of a honeycomb structure having thin partition walls that suppresses the occurrence of chipping.

DISCLOSURE OF THE INVENTION

To begin with, the inventors of the present invention earnestly researched the mechanism of chipping in honeycomb structures in which the partition wall thickness is 0.13 mm or less.

As a result, the following matters were found.

Namely, in the honeycomb structure of the prior art, external force is applied during drying of the honeycomb support extruded from an extrusion mold, when dragging at the time of handling and transport (such as when the honeycomb structure is hooked at the outlet of the dryer during removal work from the dryer or when the honeycomb structure is taken off of the dryer belt while dragging), when clamping during cutting of both ends, and when taking the honeycomb support in and out of the kiln during firing to form a honeycomb structure.

At these times, there are cases in which force is produced within the honeycomb structure from the inside to the outside to the partition walls and peripheral wall, resulting in the application of point-contact force to the peripheral wall of the honeycomb structure. In such a case, in the honeycomb structure of the prior art, the circumference of the peripheral wall dissipates force by micro-chipping, resulting in a structure that is able to withstand external impacts.

However, in a honeycomb structure 80 having an extremely thin wall thickness as shown in FIG. 1, in the case force is produced from the inside to the outside relative to the partition walls and peripheral wall, it was found that a large edge chipping 82 is induced by the resulting micro-chipping of the peripheral wall.

In the case of having thick partition walls as in the prior art, the occurrence of edge chipping is inhibited by the sufficient joining strength as a result of the contact width between the peripheral wall and partition walls being large relative to a force like that which tries to pull apart the outer peripheral wall. In contrast, it was found that in the case the partition walls are extremely thin, and particularly in cases in which the partition walls are 0.13 mm or less in thickness, due to the small contact width between the peripheral wall and partition walls, the honeycomb structure is extremely weak with respect to force applied from the inside to the outside of the honeycomb structure, thereby resulting in the occurrence of edge chipping.

Here, the relationship between partition wall thickness and the occurrence of edge chipping is shown in FIG. 2.

As is also clear from FIG. 2, when partition wall thickness is 0.13 mm or less, there is a sudden increase in the occurrence of edge chipping.

Therefore, claim 1 of the invention of the present application discloses a honeycomb structure having a mean partition wall thickness of 0.05 mm to 0.13 mm, wherein the mean thickness of the partition wall is greater than said mean partition wall thickness T (mm), and mean contact width w satisfies the relationship between mean partition wall thickness T and the mean contact width w (mm) between the partition walls and peripheral wall is such that w>T and $0.7 \geq w \geq (T/4)+0.18$.

As a result of employing this constitution, the contact width between the peripheral wall and partition walls is sufficiently large, and the honeycomb structure can be made to be extremely resistant to force applied from the inside to the outside of the honeycomb structure, thereby making it possible to inhibit the occurrence of edge chipping.

In addition, according to claim 2, the formation of rounded corners is preferable for the above-mentioned partition walls at the junctions between the above-mentioned partition walls and peripheral wall.

In this manner, the forming of rounded corners makes it possible to increase contact surface area without lowering pressure loss, while also inhibiting the occurrence of chipping, and especially edge chipping.

In the honeycomb structure of the prior art, in the case force is applied from the inside to the outside along a direction perpendicular to the flow paths of the honeycomb structure, tensile force occurs in the peripheral wall and partition walls causing stress to concentrate in the junctions between the peripheral wall and partition walls resulting in greater susceptibility to breakage. However, as a result of forming rounded corners, this concentration of stress can be inhibited thereby making it possible to inhibit edge chipping.

In addition, as a result of forming rounded corners, not only can edge chipping be inhibited, but also chipping of the peripheral wall and partition walls can be inhibited without increasing the overall weight of the ceramic honeycomb structure in which the partition walls and peripheral wall can be made wider overall.

Moreover, even in the case in which chipping occurs due to force acting in the direction from the outside to the inside, chipping occurs easily in which bending force occurs in the partition walls that support the peripheral wall in the same manner as described above. However, in the case of forming rounded corners, it becomes easier to support external force by forming an artificial dome shape by combining the rounded corners of the contact portions, thereby making it possible to inhibit the occurrence of chipping.

In addition, in claim 3, the use of a mean radius of 0.06 to 0.30 mm for the rounded corners makes it possible for further inhibit chipping.

In addition, in claim 4, it is preferable that the porosity of the honeycomb structure be larger than 30%.

In the prior art, as in Japanese Examined Patent Publication No. 4-70053, in the case of attempting to obtain a thin-walled honeycomb structure, the porosity becomes small to improve the strength of the partition walls themselves.

However, in the case the porosity is less than 30%, it is not possible to secure a sufficient amount of supported catalyst for the ceramic honeycomb structure.

However, by employing claim 4, it is possible to obtain a ceramic honeycomb structure that inhibits the occurrence of chipping while maintaining an adequate amount of supported catalyst.

In claim 5, it is preferable that partition wall reinforcing portions having a mean thickness of 0.1 to 0.3 mm at the region extending in the direction from said peripheral wall to the center of said ceramic honeycomb structure by 1.2% to 15% of the distance from said peripheral wall to the center of said ceramic honeycomb structure be provided. As a result of employing this type of constitution, not only can the occurrence of edge chipping be inhibited, but the shape retention of the molded product before drying can be increased.

In addition, in claim 6, it is preferable to form a tapered portion at the boundary region between said partition walls and said partition wall reinforcing portions. As a result of employing this type of constitution, even though the partition walls and partition wall reinforcing portions have different thicknesses, the difference in thermal expansion relative to a cooling and heating cycle can be relieved, thereby making it possible to inhibit the occurrence of cracking.

In addition, in claim 9, in addition to the formation of partition wall reinforcing portions, rounded corners may be formed between said peripheral wall and said partition wall reinforcing portions. As a result of employing this type of constitution, the occurrence of edge chipping can be further inhibited.

The reason for this is has been previously described.

In addition, in claim 10, it is preferable that the mean radius of these rounded corners be 0.06 mm to 0.30 mm.

In addition, in claim 11, it is preferable that the porosity of the honeycomb structure be greater than 30%.

The reason for this is has been previously described.

In addition, in claim 12, it is preferable that the thickness of the peripheral wall of the honeycomb structure be 1.1 mm or less.

If the thickness of the peripheral wall is greater than 1.1 mm, it is not possible to obtain a honeycomb structure having good resistance to thermal shock.

In addition, in claim 13, it is preferable that width of the region of said partition wall reinforcing portions from said peripheral wall be roughly uniform.

As a result of employing this type of constitution, pressure loss can be balanced in the entire honeycomb structure.

In addition, in claim 14, after forming initial slits having a width smaller than a prescribed width in a mold, an abrasive is passed, in slits corresponding to the junctions between said peripheral wall and said partition walls, through said initial slits while gradually shifting a mask smaller towards said center from said peripheral wall, rounded corners are formed at the junctions between said peripheral wall and said partition walls in the mold. A ceramic honeycomb structure in which rounded corners are formed at the junctions between partition walls and a peripheral wall can easily be obtained by passing through said slits of the above extrusion mold.

In addition, in claim 15, after forming initial slits having a width smaller than a prescribed width in a mold, an abrasive is passed in slits corresponding to the boundary regions between said partition wall reinforcing portions and said partition walls, through said initial slits while gradually shifting a mask towards said center from said partition wall reinforcing portions, tapered portions can be formed in the boundary regions between said partition wall reinforcing portions and said partition walls in the mold. A ceramic honeycomb structure having partition wall reinforcing portions can easily be obtained by passing through said slits of said extrusion mold in which slits are formed in the above manner.

In addition, in claim 16, after forming initial slits having a width larger than a prescribed width in a mold, plating liquid is passed through said initial slits of said mold in a state of providing spaces at least between slits, corresponding to the junctions between said peripheral wall and said partition walls, and a mask, to form a plating layer on the surface of said initial slits, so that said slits having a desired width are formed and, in those slits in which spaces are provided between said slits and a mask, the plating thickness changes as a result of restricting the circulation of plating liquid, and accompanying this, the slit width is gradually changed. A ceramic honeycomb structure in which the junctions between said peripheral wall and said partition walls are reinforced can be easily obtained by passing through said slits of the obtained extrusion mold in which the slit width is gradually changed.

In addition, in claim 17, after forming initial slits having a width larger than a prescribed width in a mold, plating liquid is passed through said initial slits of said mold in a state of providing spaces at least between slits, corresponding to the boundaries between said peripheral wall and said partition wall reinforcing portions, and a mask, to form a plating layer on the surface of said initial slits, so that said slits having a desired width are formed and, in those slits in which spaces are provided between said slits and a mask, the plating thickness changes as a result of restricting the circulation of plating liquid, and accompanying this, the slit width is gradually changed. A ceramic honeycomb structure in which partition wall reinforcing portions are formed can be easily obtained by passing through said slits of the resultant extrusion mold in which the slit width is gradually changed.

BRIEF DESCRIPTION OF THE DRAWINGS

FIG. 3A shows a general view of a honeycomb structure of a first embodiment, while

FIG. 4 is a graph showing the distribution of the occurrence of edge chipping when partition wall thickness and mean contact width are changed.

BEST MODE FOR CARRYING OUT THE INVENTION

First Embodiment

Figure 3A:
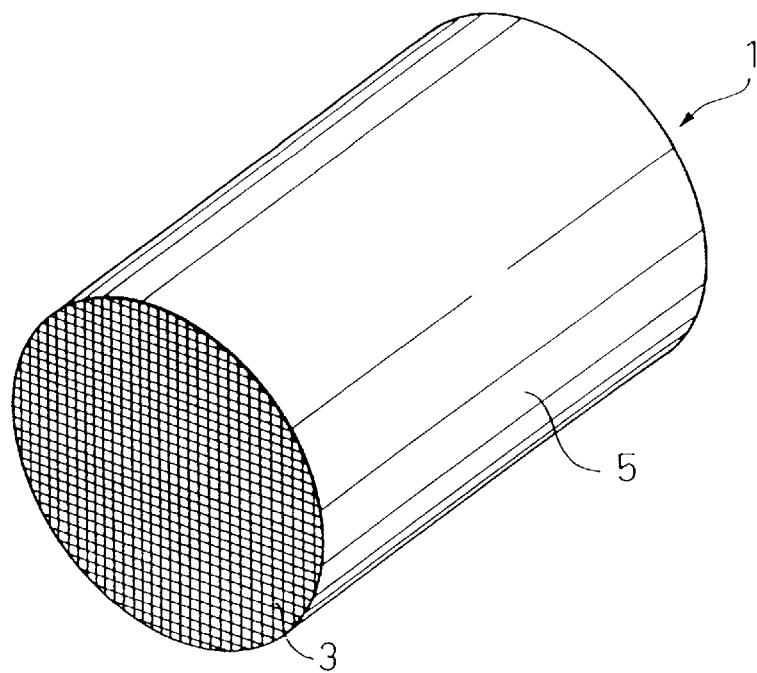
Figure 3B:
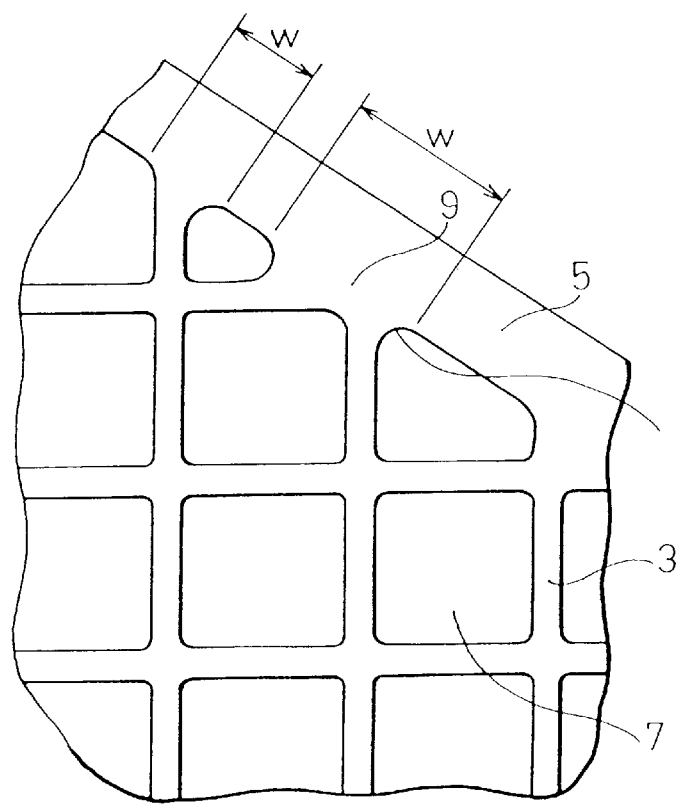
FIG. 3B shows an enlarged view of a portion of the end face of the honeycomb structure of a first embodiment.

The constitution of the honeycomb structure of the present invention is shown in FIGS. 3A and 3B. FIG. 3A is a general view of honeycomb structure 1 of the present invention, while FIG. 3B is an enlarged view of a portion of the end face of honeycomb structure 1 of the present invention.

Honeycomb structure 1 of the present invention has a cylindrical shape and, is made of a cordierite material obtained by firing kaolin, talc or alumina and so forth.

In addition, as is described later, partition walls 3 and peripheral wall 5 formed integrated into a single unit by extrusion molding. A honeycomb structure 1 has a porosity of 35%.

This honeycomb structure is composed of partition walls 3 and peripheral wall 5 that covers the periphery of partition walls 3.

These partition walls 3 form mutually adjacent flow paths 7 having a square cross-section, and have a mean thickness of 0.104 mm.

In addition, peripheral wall 5 is formed integrated into a single unit with partition walls 3, hold partition walls 3 in the form of a single unit from the outside, and has a mean thickness of 0.65 mm.

The present embodiment in particular is characterized by a contact width w at junctions 9 of partition walls 3 with peripheral wall 5 being at least 0.3 mm and larger than the mean thickness of partition walls 3 as a result of forming rounded corners having a mean radius of 0.1 mm at junctions 9 between partition walls 3 and peripheral wall 5.

In this manner, the contact surface area of partition walls 3 and peripheral wall 5 can be made larger by making contact width w of junctions 9 of partition walls 3 larger than the mean thickness of partition walls 3.

Consequently, since the honeycomb structure can be made stronger with respect to force applied in a direction from the inside to the outside of the honeycomb structure, a honeycomb structure can be obtained in which the occurrence of edge chipping is inhibited.

Moreover, in honeycomb structure 1 of this first embodiment, since the constitution merely involves making contact width w between partition walls 3 and peripheral wall 5 larger, pressure loss of the honeycomb structure itself can be minimized, and there is hardly any increase in heat capacity, so that favorable early activity can be obtained in the case of supporting a catalyst.

What is more, in honeycomb structure 1 of this first embodiment, since the porosity is 35%, the occurrence of edge chipping can be inhibited while maintaining the catalyst support properties of honeycomb structure 1.

Next, a description is provided of the manufacturing method of honeycomb structure 1 described above.

To begin with, a suitable particle size distribution is obtained by respectively screening kaolin, talc and alumina, etc. by sieves.

Then, 44–50% of a combination of kaolin having a mean particle size of 5 $\mu$m and kaolin having a mean particle size of 0.5 $\mu$m, 35–41% of talc having a mean particle size of 8 $\mu$m, 13–19% of aluminum hydroxide having a mean particle size of 1.2 $\mu$m and the remaining amount of alumina, are blended and fired so as to obtain a cordierite chemical composition. Since natural products are usually used for these raw materials, and differences in the composition of kaolin, talc and alumina may vary depending on the origins, the blending ratios are changed so as to obtain a cordierite chemical composition by analyzing the composition of the raw materials as is necessary.

After mixing the raw materials well to obtain a uniform mixture, water, binder and so forth are added followed by kneading to produce clay.

After molding this clay into rods using a screw molding machine or other molding machine, the honeycomb support is formed, which is the honeycomb structure before firing, by passing the rods through an extrusion mold by a plunger molding machine.

The formed honeycomb support is placed in a dryer and uniformly heated to evaporate moisture, after which it is cut to into equal, predetermined sizes and placed in a continuous furnace. It is then fired for 5 hours at 1350–1450° C. to obtain honeycomb structure 1 of the present invention.

Partition walls 35 having a porosity of 35% are formed in this honeycomb structure 1 that form 400 mesh flow paths 7 measuring 103 mm in diameter and 150 mm in length.

Next, the following indicates the results of measuring the optimum range of contact width of honeycomb structure 1.

FIG. 4 shows the relationship between thickness T of each partition wall 3 and mean contact width w.

Circles (O) indicate those conditions under which the incidence of edge chipping is 5% or less, while X's indicate those conditions under which the incidence of edge chipping exceeded 5%, in honeycomb structures obtained by firing 70 green honeycomb supports.

Furthermore, for the method used to measure the incidence of edge chipping, those honeycomb supports in which defects of 10 mm or more in the circumferential direction or lengthwise direction occurred were evaluated and counted as exhibiting the occurrence of edge chipping.

As is clear from this graph, a straight line as shown in FIG. 4 can be obtained by connecting the boundary between the circles and X's of FIG. 4 in the form of a straight line.

It can be understood from FIG. 4 that the optimum mean contact width between partition walls 3 and peripheral wall 5 is preferably above the straight line shown in FIG. 4.

The following condition was able to be obtained from FIG. 4: $w \geq -(T/4)+0.18$.

Figure 1:
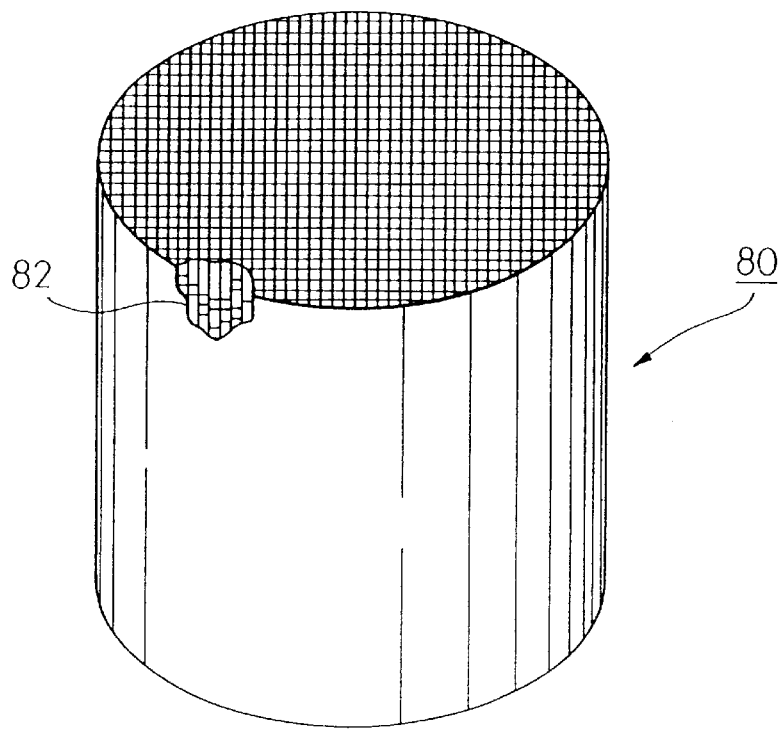
FIG. 1 is an explanatory drawing that explains edge chipping of the honeycomb structure of the prior art.
Figure 2:
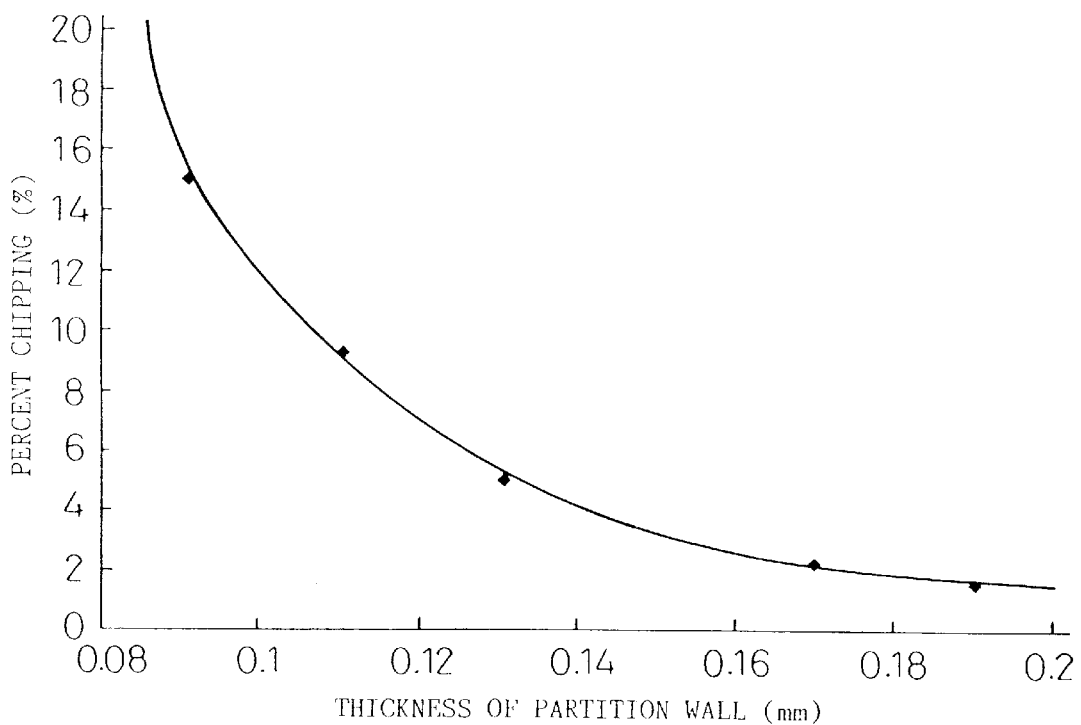
FIG. 2 is a graph showing the relationship of the incidence of edge chipping to partition wall thickness.

In FIG. 2, however, since partition wall thickness is always greater than mean contact width, the condition of $w>T$ must also be satisfied.

In addition, although it is true that the incidence of edge chipping can be reduced if mean contact w is increased relative to the partition walls, an increase in mean contact width of 0.7 mm or more has hardly any effect on reducing the incidence of edge cracking, while conversely leaving only the problem of increased weight of the honeycomb structure. Accordingly, mean contact width of 0.7 mm or more is preferable.

Figure 5:
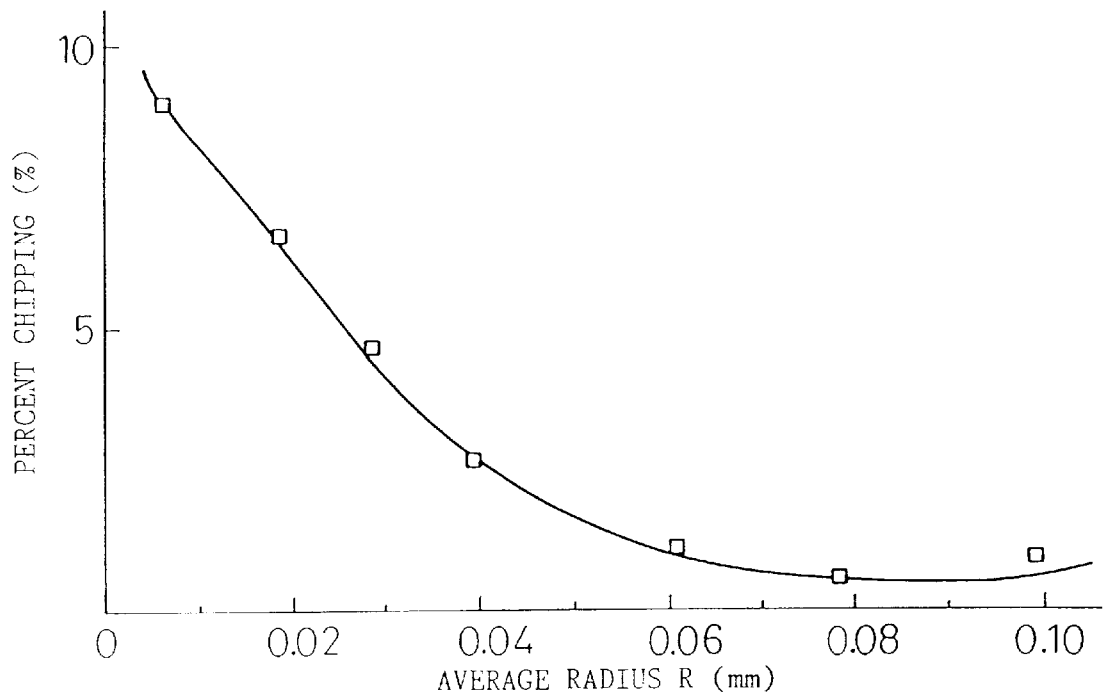
FIG. 5 is a graph showing the relationship between the mean radius of rounded corners and the incidence of edge chipping.

Next, the relationship between mean radius and the incidence of edge chipping is shown in FIG. 5.

The incidence of edge chipping at this time was determined using the same method as that used for incidence of edge chipping in FIG. 4.

Furthermore, the incidences of edge chipping were determined in the case of only changing the radius of the respective rounded corners in a honeycomb structure having a partition wall thickness of 0.104 mm, peripheral wall thickness of 0.65 mm and porosity of 35%.

As is clear from this graph, the incidence of edge chipping can be sufficiently reduced by making the mean radius of the rounded corners 0.06 mm or more. Consequently, it is preferable that the mean radius of the rounded corners be 0.06 mm or more.

However, although it is true that the incidence of edge chipping can be reduced by increasing the mean radius of the rounded corners according to FIG. 5, the case of making the mean radius of the rounded corners larger than 0.30 mm has hardly any effect on reducing the incidence of edge chipping, while conversely leaving only the problem of increased weight of the honeycomb structure.

Consequently, a value of 0.06 to 0.30 mm is preferable for the mean radius of the rounded corners.

Chipping of the honeycomb structure, the subject of the present invention, can be prevented by forming these rounded corners.

Figure 6:
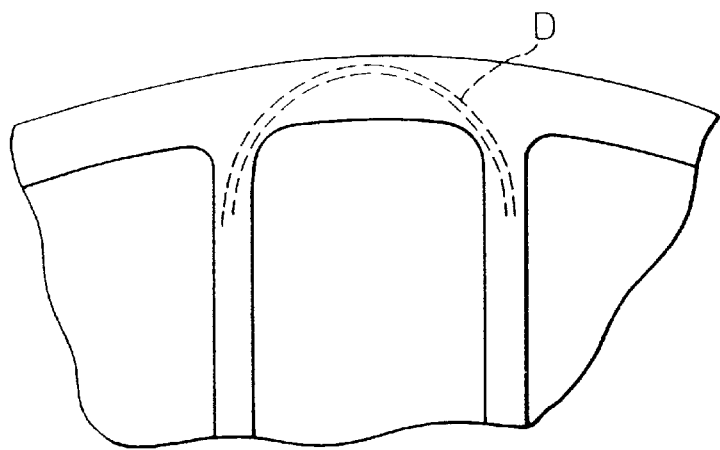
FIG. 6 is an explanatory drawing showing the effect in the case of forming rounded corners.

In addition, even in cases in which chipping occurs due to the application of force from the outside to the inside, chipping typically occurs easily due to the generation of bending force in the partition walls that support the peripheral wall, in the same manner as described above in honeycomb structures. However, as is shown in FIG. 6, the occurrence of chipping can be inhibited as a result of making it easier to support external force by forming artificial dome shape D, in addition to the shape of the rounded corners of those portions that make contact.

Figure 7:
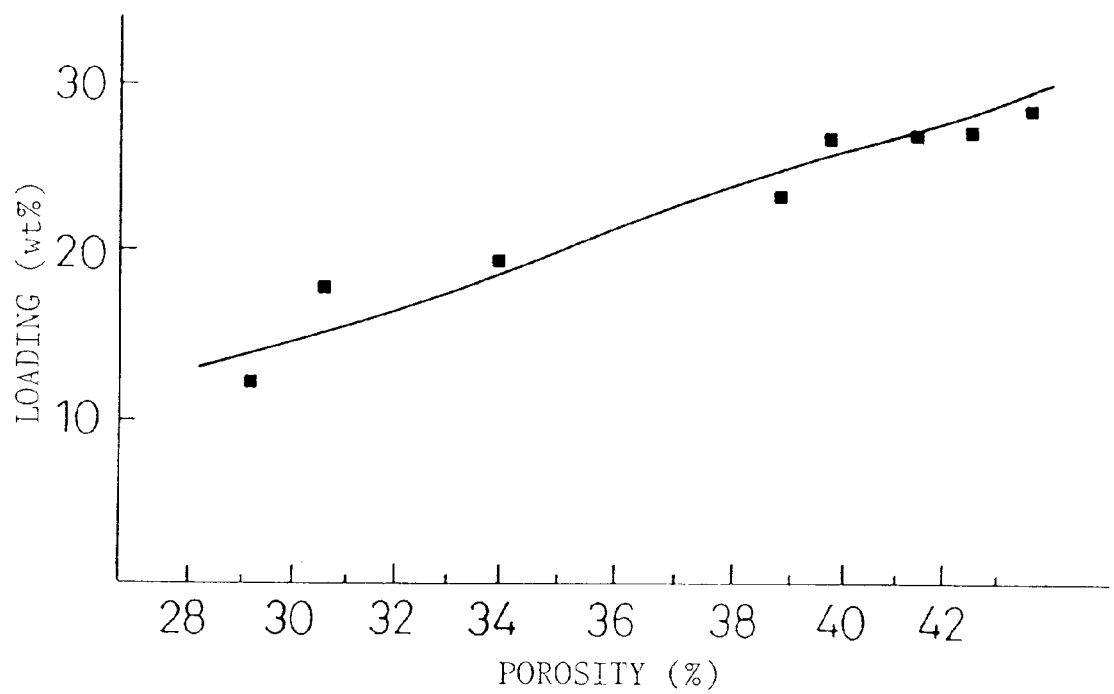
FIG. 7 is a graph showing the relationship between porosity and the amount of supported catalyst.

Next, the relationship between porosity of the honeycomb structure and the amount of supported catalyst is shown in FIG. 7.

The honeycomb structure used at this time has a partition wall thickness of 0.104 mm and peripheral wall thickness of 0.65 mm.

As shown in FIG. 7, as the porosity of the honeycomb structure increases, the amount of catalyst supported can also be increased, and by making the porosity 30% or more in particular, the desired amount of supported catalyst of 14% by weight can be obtained.

Figure 8:
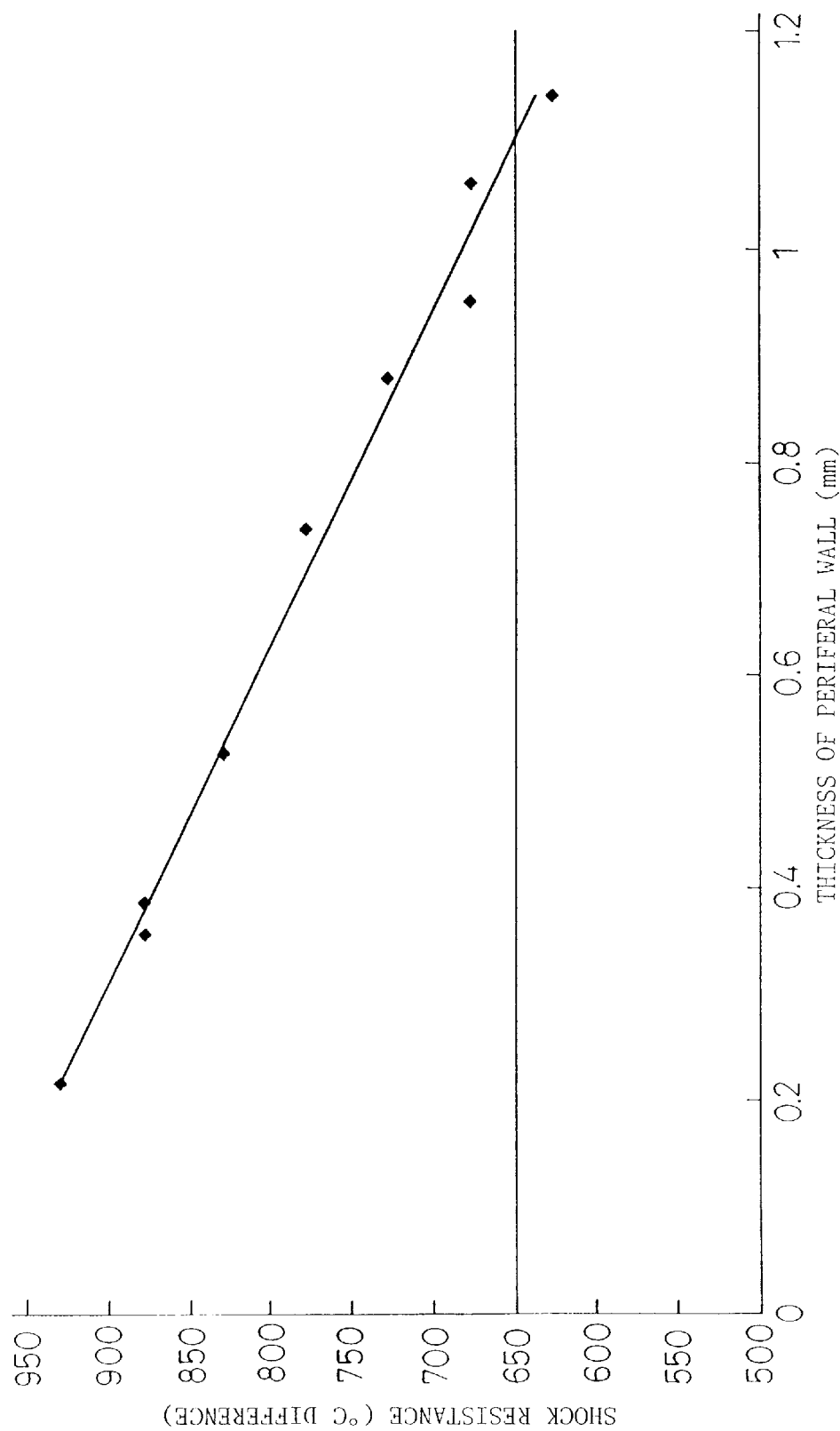
FIG. 8 is a graph showing the relationship between peripheral wall thickness and thermal shock resistance.

Next, the relationship between peripheral wall thickness and thermal shock resistance is shown in FIG. 8.

Here, thermal shock consisted of heating for 1 hour at the set temperature and then exposing to room temperature within 1 minute. The presence of crack formation was examined after allowing the structure to cool in the air.

The structure was measured under these conditions and if the temperature difference of the resistance to thermal shock was 650° C. or more, it was judged to have thermal shock resistance.

In addition, the honeycomb structure used had a partition wall thickness of 0.104 mm and porosity of 35%.

Having resistance to thermal shock of 650° C. or more makes it possible to prevent thermal stress damage with respect to rapid heating and rapid cooling by exhaust gas and raw gas from an engine.

It can be understood from FIG. 8 that structures having thermal shock resistance have a partition wall thickness of 1.1 mm or less.

This is because, if partition wall thickness is greater than 1.1 mm, a temperature difference occurs between the inside and surface of the partition wall as a result of being subjected to a heating and cooling cycle. Consequently, stress and strain in the partition wall increase, thereby preventing the structure from having resistance to thermal shock.

Second Embodiment

Next, an explanation is provided of a second embodiment of the present invention.

Instead of simply making contact width w of the junctions of partition walls 3 and peripheral 5 larger than the thickness of partition walls 3 as in the first embodiment, this second embodiment is characterized by increasing the contact surface area between partition walls 3 and peripheral wall 5 by increasing the thickness of partition walls 3 over a fixed region.

The following provides an explanation of this second embodiment. Here, the same reference numerals are used for the same portions, and the explanation only focuses on those portions of the constitution that are different from the first embodiment.

Figure 9:
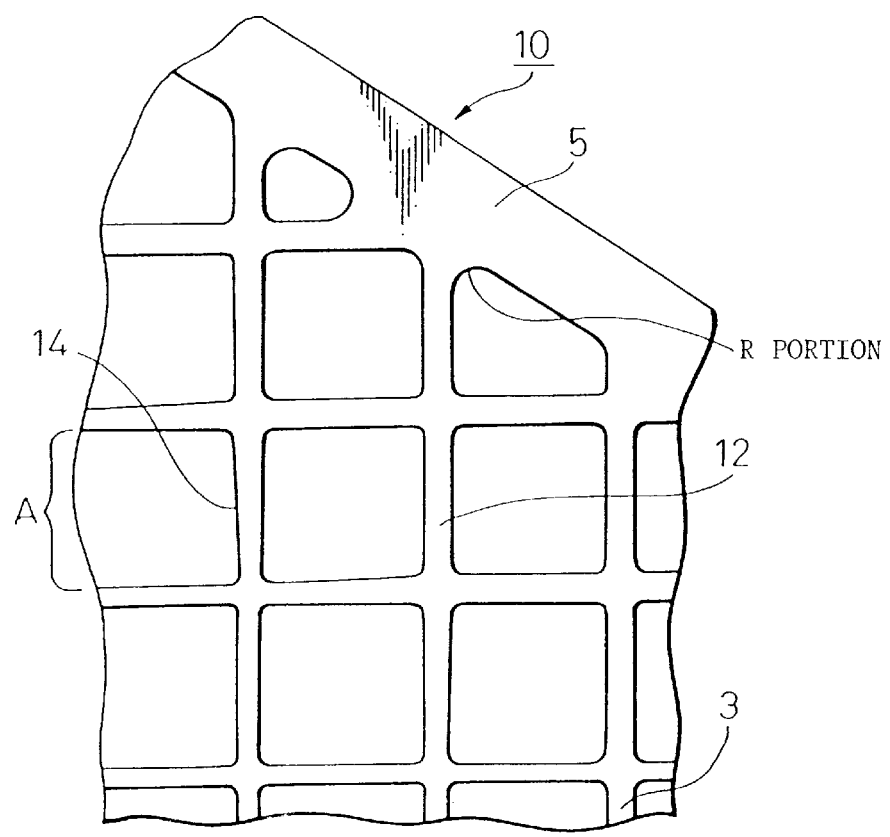
FIG. 9 is an enlarged view of a portion of the end face of a honeycomb structure of a second embodiment.

An enlarged view of a portion of the end face of honeycomb structure 10 of this second embodiment is shown in FIG. 9.

Honeycomb structure 10 of this second embodiment has roughly circular cross-section in the direction perpendicular to the direction of the flow path.

In this second embodiment in particular, partition wall reinforcing portions 12 having a thickness of 0.2 mm which is larger than the mean thickness of partition walls 3 are formed in regions extending in the direction forward the center of the honeycomb structure by two cells in the direction from peripheral wall 5 to the center of the honeycomb structure. Moreover, boundary region A, which is the width of the boundary between these partition wall reinforcing members 12 and partition walls 3, is roughly uniform over the entire circumference.

In addition, the boundary region A between partition walls 3 and partition wall reinforcing portions 12 is formed integrated into a single unit by tapered portions 14, which are formed within one cell.

In addition, rounded corners having a mean radius of 0.1 mm as in the honeycomb structure of the first embodiment are formed at the junctions of peripheral wall 5 and partition wall reinforcing members 12.

The following effects can be obtained by employing the honeycomb structure of the second embodiment as described above.

Namely, since the honeycomb structure can be made stronger with respect to force applied in a direction from the inside to the outside of the honeycomb structure by securing a large contact surface area between partition walls 3 and peripheral wall 5 due to partition wall reinforcing portions 12, a honeycomb structure can be obtained in which the occurrence of edge chipping is inhibited.

In addition, since partition wall reinforcing portions 12 are newly formed, the occurrence of edge chipping can be inhibited to a greater extent than the honeycomb structure of the first embodiment.

Moreover, the shape retention of the molded honeycomb structure prior to drying can be improved, and retention of dimensional accuracy can also be improved.

What is more, since tapered portions 14 are provided in the boundary regions between partition walls 3 and partition wall reinforcing portions 12, in the case of, for example, using the honeycomb structure for supporting a catalyst for an internal combustion engine, where the honeycomb structure is subjected to high temperatures due to exhaust gas and so forth from the internal combustion engine, and at that time, crack formation occurs due to thermal expansion caused by mutual differences in thickness, these tapered portions 14 are able to inhibit the occurrence of cracking caused by thermal expansion.

Moreover, the occurrence of slippage and strain in partition walls 3 caused by changes in the flow rate of the clay that occur when partition walls 3, which are extremely thin, and partition wall reinforcing portions 12, which are thicker than partition walls 3, are continuously molded and integrated into a single unit can be inhibited as a result of tapered portions 14 relieving the changes in flow rate by making partition walls 3 and partition wall reinforcing members 12 continuous through tapered portions 14.

In addition, if tapered portions 14 are provided over a range roughly equal to a single flow path, the flow rate of the clay during molding is relieved, thereby making it possible to inhibit the occurrence of strain in the partition walls.

In this second embodiment, tapered portions 14 may be provided with the width of the partition wall reinforcing portions being 2 to 3% of the distance from peripheral wall 5 to the center of the honeycomb structure.

Moreover, tapered portions may also be provided over the range of a plurality of flow paths. The flow rate can be made even more uniform by forming tapered portions over the range of a plurality of flow paths.

In addition, by forming rounded portions at the junctions of peripheral wall 5 and partition wall reinforcing portions 12, the contract surface area between the outer wall and the cell plate is increased, thereby making it more difficult for edge chipping to occur.

Here, making the size of contact width w between partition wall reinforcing portions 12 and peripheral wall 5 equal to or larger than the length of one side of the opening is not desirable since it results in a large loss of effective cross-sectional area of the cell.

Figure 10:
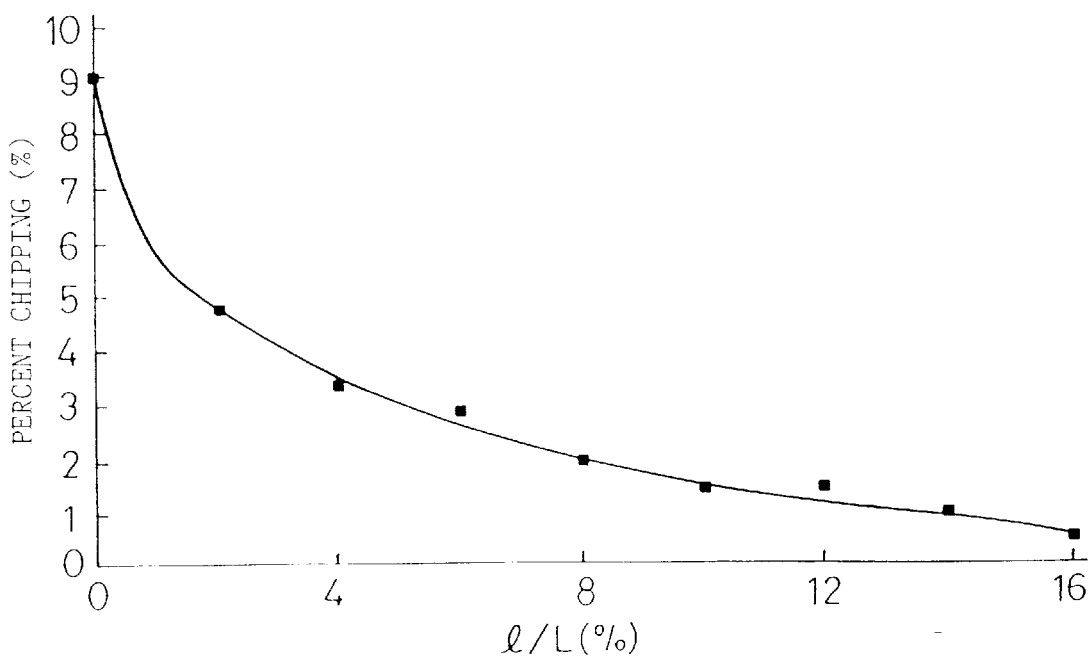
FIG. 10 is a graph showing the relationship of the incidence of edge chipping to the width of partition wall reinforcing portions.

Next, the relationship between the length of partition wall reinforcing walls 12 and the incidence of edge chipping is shown in FIG. 10.

In FIG. 10, a honeycomb structure is used in which, in addition to fixing the thickness of partition wall reinforcing portions 12 at 0.15 mm, the thickness of the partition walls is 0.104 mm, the radius of the rounded corners is 0.1 mm, and porosity is 35%.

Figure 11:
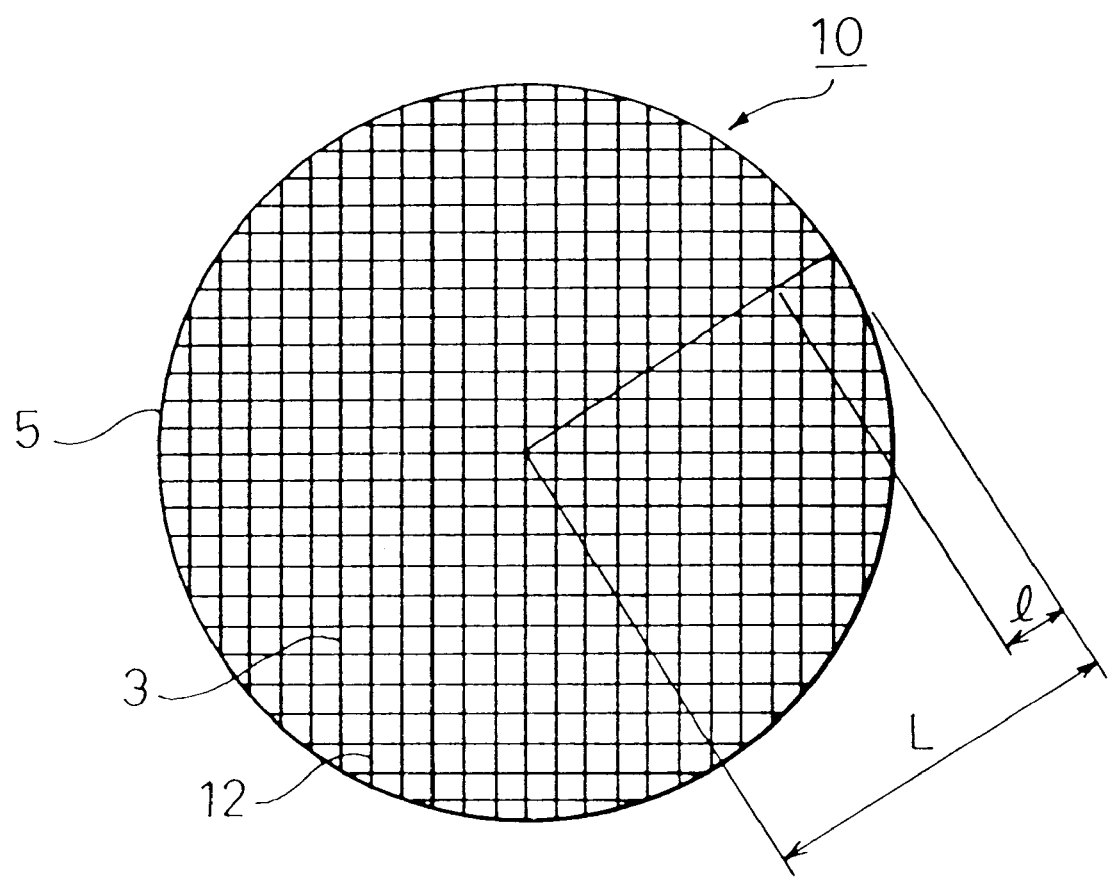
FIG. 11 is an explanatory drawing explaining the width of partition wall reinforcing portions.

In addition, the width of partition wall reinforcing portions 12 is shown as the ratio of the width (1) of partition wall reinforcing portions 12 to the distance (L) from peripheral wall 5 to the center of honeycomb structure 10 as shown in FIG. 11.

As a result, as is clear from FIG. 10, by making the width (1) of partition wall reinforcing portions 12 1.2% or more of the distance (L) from peripheral wall 5 to the center of honeycomb structure 10, the incidence of edge chipping can be inhibited dramatically.

In addition, although it is true that the incidence of edge chipping can be further inhibited as the width (1) of partition wall reinforcing portions 12 is greater, width (1) of partition wall reinforcing portions 12 cannot be increased beyond that which is necessary since the pressure loss of the honeycomb structure ends up increasing.

Figure 12:
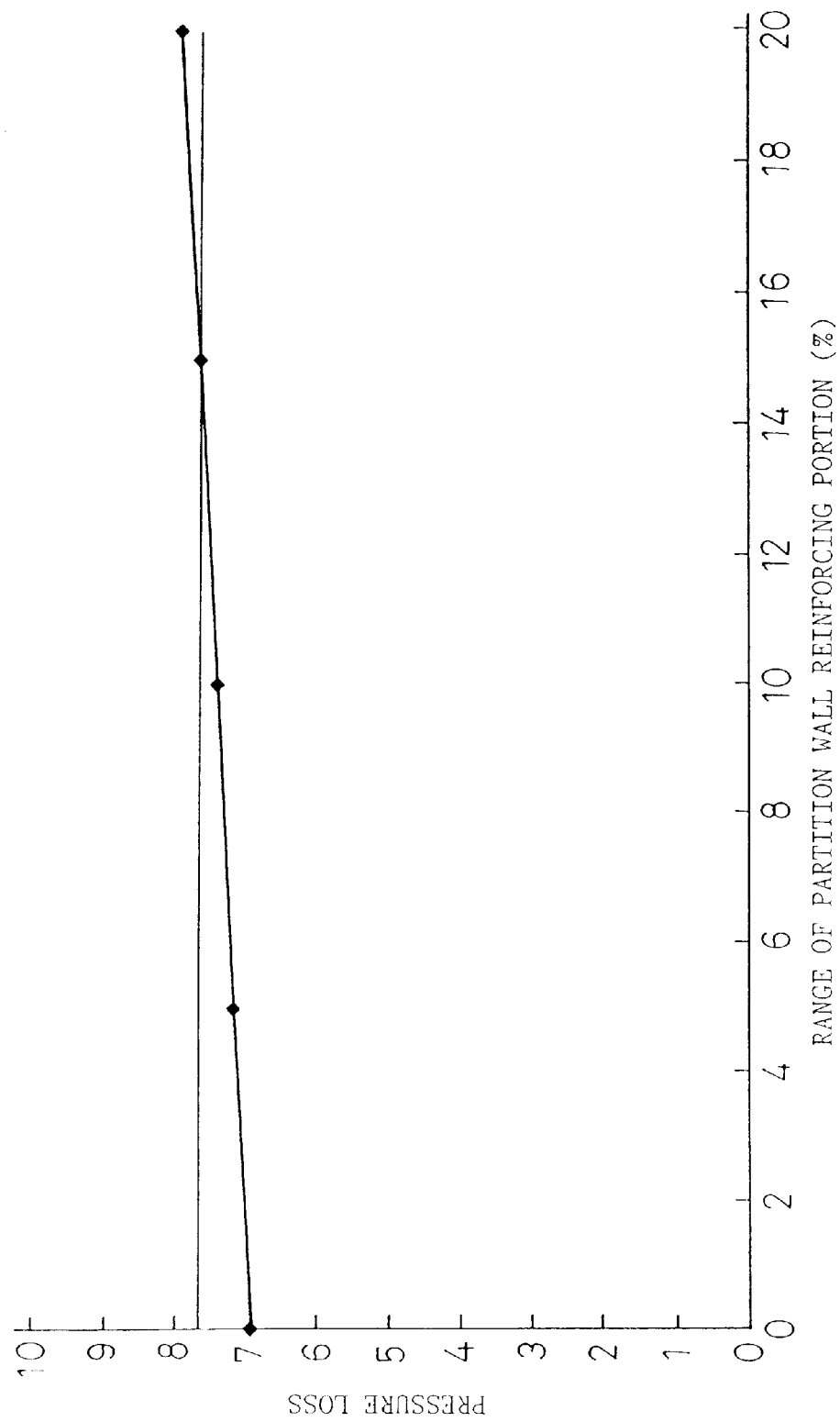
FIG. 12 is a graph showing the relationship of pressure loss to the width of partition wall reinforcing portions.

FIG. 12 shows the relationship of pressure loss to the width of partition wall reinforcing portions 12.

The honeycomb structure used at this time had a partition wall reinforcing portion thickness of 0.3 mm, partition wall thickness of 0.104 mm, rounded corner radius of 0.1 mm, porosity of 35%, 400 mesh and a diameter of 103 mm.

In addition, the engine speed of the internal combustion engine was set at 4000 rpm.

In addition, the width of the partition wall reinforcing portions was indicated as the ratio of the width (1) of partition wall reinforcing portions 12 to the distance (L) from partition wall 5 to the center of honeycomb structure 10 as shown in FIG. 11.

As is clear from FIG. 12, when width (1) of partition wall reinforcing portions 12 is 15% or more relative to distance (L) from peripheral wall 5 to the center of the honeycomb structure, pressure loss becomes 7.8 kPa and above.

Here, the problem occurs in which the output of the internal combustion engine itself rapidly decreases when pressure loss is 7.8 kPa or higher.

As has been described above, it can be understood from FIGS. 10 and 12 that it is preferable that the width of the partition wall reinforcing portions be from 1.2% to 15% relative to the distance from peripheral wall 5 to the center of the honeycomb structure.

However, as described above, in the honeycomb structures shown in the first and second embodiments, the shape is determined by a slurry passing through slits formed in an extrusion mold.

Figure 13:
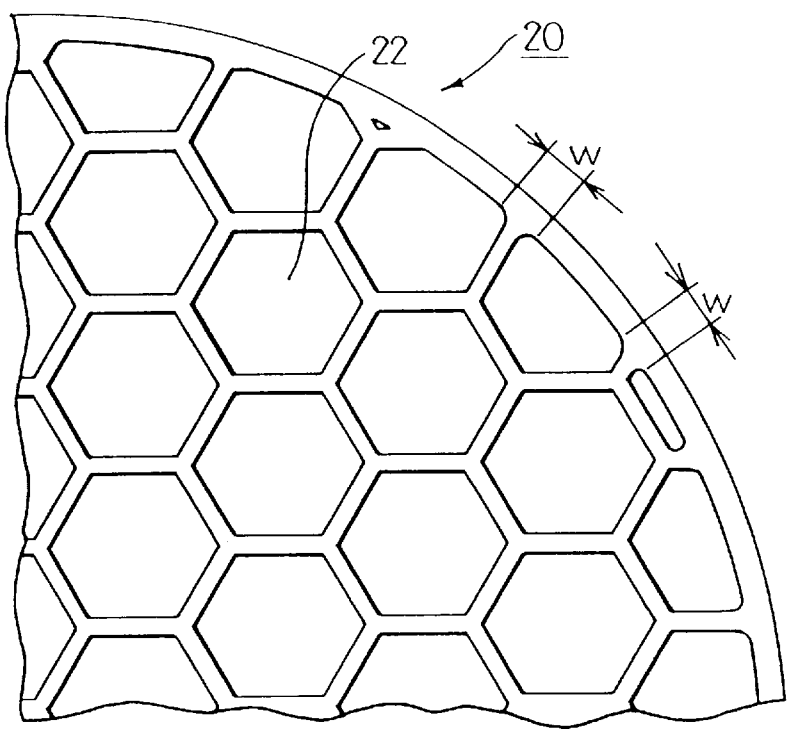
FIGS. 13 through 15 are explanatory drawings showing another embodiments of the present invention.
Figure 14:
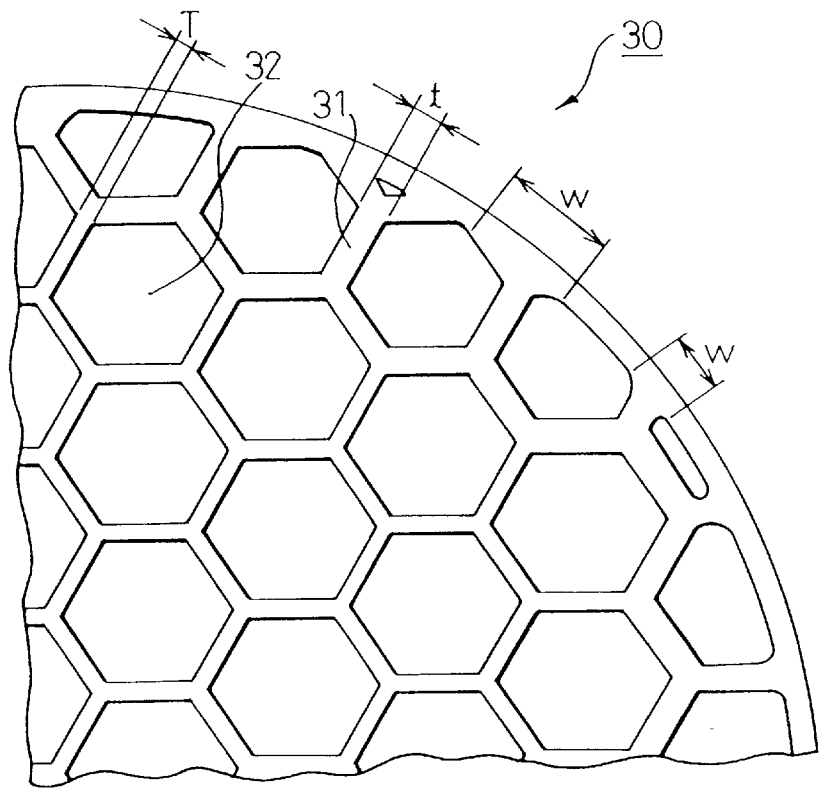

The honeycomb structures 20 and 30 may have flow paths in a shape like that shown in FIGS. 13 and 14.

Namely, the action and effects of the present invention can be achieved even if the cross-sectional shape of flow paths 22 and 32 have a hexagonal cross-section.

In addition, at this time, although the partition wall thickness (T) is 0.15 mm and the mean contact width (w) is 0.25 mm, a structure can be adopted that includes partition wall reinforcing portions 31 (thickness t) as shown in FIG. 14.

Figure 15:
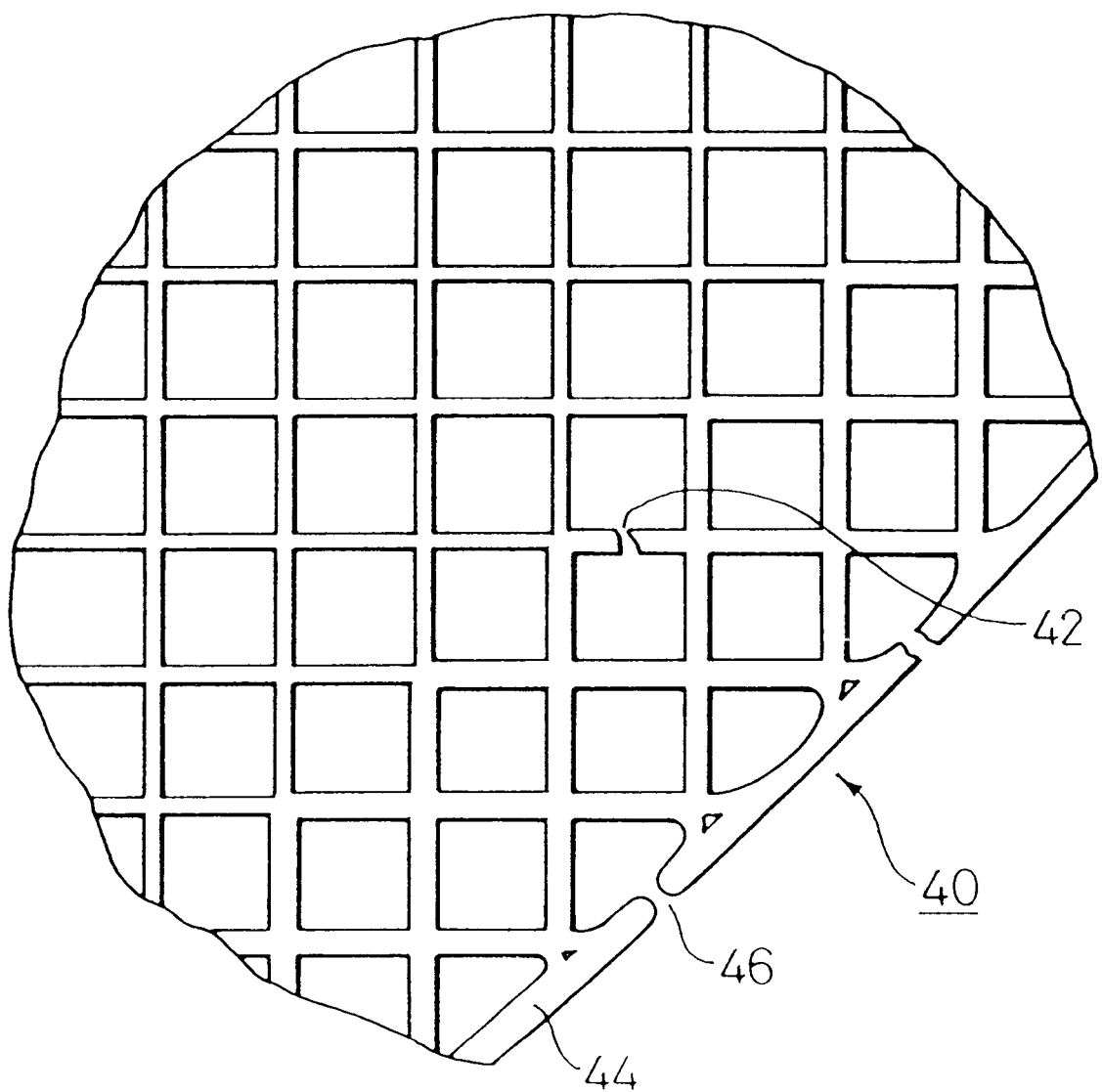

Moreover, the flow path in the present invention may be in a honeycomb structure having communicating portions 42 between mutually adjacent flow paths and missing portions 46 at portions of peripheral wall 44 as shown in FIG. 15.

Next, the following is a description of the manufacturing methods of die bodies for obtaining honeycomb structures 1 and 10 shown in the first and second embodiments.

The following two methods are preferably used as a manufacturing method of a die body for obtaining a honeycomb structure in having partition walls and a peripheral wall, and as in the present invention in particular, wherein rounded corners are formed at contact portions or partition wall reinforcing portions are formed.

Namely, these two methods consist of a method wherein a desired slit width is obtained by passing an abrasive clay through slits, and a method wherein a desired slit width is obtained by performing surface treatment such as plating.

Figure 16:
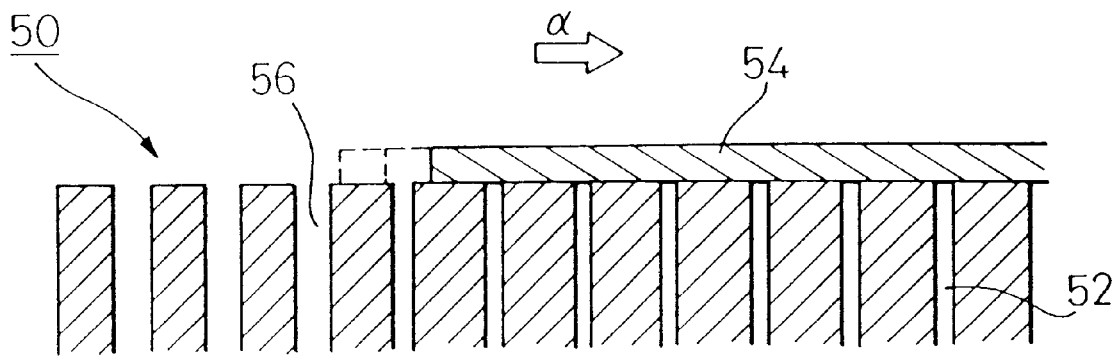
FIG. 16 is an explanatory drawing explaining the mold manufacturing method of the present invention.

Here, a detailed explanation is provided of the first method using FIG. 16.

In this first method, initial slits 52, formed to have a thickness smaller than the desired thickness, are formed in advance by, for example, grinding or electric discharge in the slit region of the mold corresponding to locations at which the partition walls, partition wall reinforcing members and so forth of die body 50 are formed.

Next, abrasive clay not shown is passed through slits 56 in the state in which a mask is applied to the portion slightly to the inside from the boundary region as shown in FIG. 16.

This abrasive clay contains an abrasive in a resin having high viscosity.

Next, the masked portion is shifted a little at a time in the direction indicated with arrow α in FIG. 16 by ½ to ¼ of one slit at a time. Each time the masked portion is shifted, the abrasive clay is passed through initial slits 52 and flow paths 56 that have not previously been masked, as a result of which the slit widths of initial slits 52 and slits 56 gradually become larger.

Figure 17:
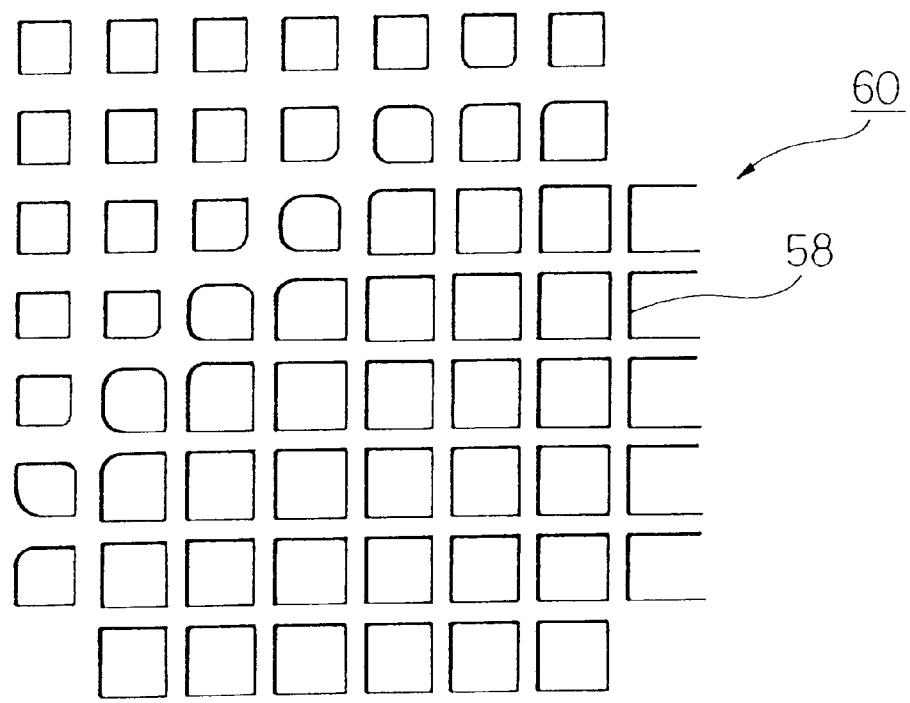
FIG. 17 is a schematic drawing of the mold of the present invention.

According to this type of method, larger slits are formed for those slits that are not initially masked, while smaller slits are formed for those slits from which the mask is removed in later steps. This variation of the slit width makes it possible to obtain die body 60 having slit portions 58 that have slit widths that continuously change as shown in FIG. 17 as a result of shifting the mask slightly by ½ to ¼ the width of a single slit each time.

Moreover, this is then performed on slits corresponding to boundary region A of partition walls 3 and partition wall reinforcing portions 12 and contact portions between partition wall reinforcing portions 12 and partition wall 5. Finally, by passing abrasive clay through slits 52 and 56 over the entire surface of the slits, slits are formed having the desired width and shape.

In this processing method, slits corresponding to the boundaries between the peripheral wall and partition wall reinforcing portions of the mold are processed first, after which the slits corresponding to boundary region A between partition walls 3 and partition wall reinforcing portions 12 are processed.

According to a die body obtained in this manner, die bodies can be easily obtained that correspond to honeycomb structures 1 and 10 having rounded corners and tapered portions as in the first and second embodiments.

In addition, since slits are ground by nearly identical abrasive clay, the surface roughness inside the slits in which tapered portions are formed can be made to be nearly uniform, thereby making it possible to reduce the difference in clay flow rates between slits corresponding to partition walls 3 and slits corresponding to partition wall reinforcing portions 12.

Figure 18:
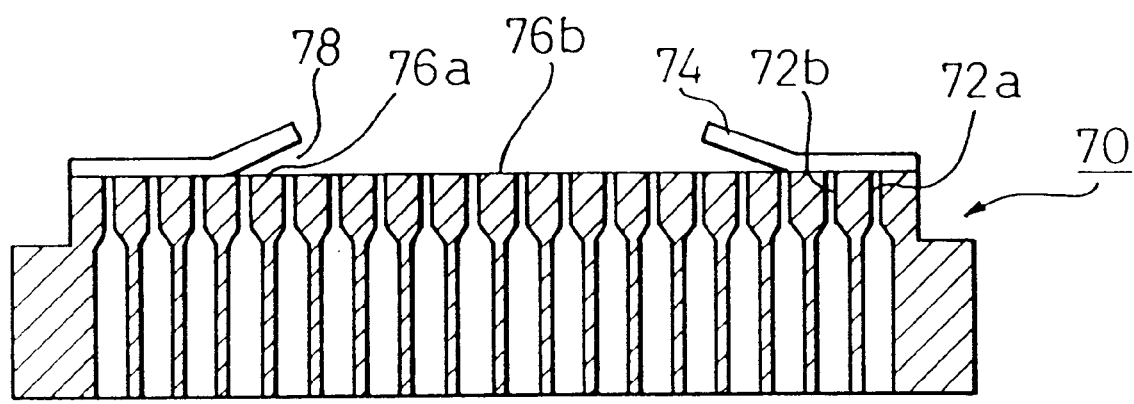
FIG. 18 is an explanatory drawing explaining the mold manufacturing method of the present invention.

Next, an explanation is provided of a second method for obtaining a die body of a desired shape, by performing surface treatment such as plating, using FIG. 18.

As shown in FIG. 18, surface treatment is performed in the state in which from slit 72a corresponding to partition walls to slit 72b corresponding to partition wall reinforcing portions are masked with a mask in the form of Teflon tape 74.

At this time, space 78 is provided between pieces of Teflon tape 74 and portion 76a corresponding to the boundary region between slits corresponding to partition walls and the slits corresponding partition wall reinforcing portions.

Next, plating liquid not shown is passed through slits 76a and 76b.

As a result of this passing through of the plating liquid, a plating layer not shown is formed only at slits 76b through which plating liquid passes, and the width of slits 76b becomes narrower due to the formation of this plating layer.

At slits 76a provided with a space 78 with a piece of Teflon tape 74, space 78 obstructs the flow of plating liquid resulting in inadequate circulation of plating liquid.

Consequently, with respect to the resulting slit widths, a die body can be obtained in which the width of slits 76a corresponding to space 78 of Teflon tape 74 can gradually be made larger relative to the width of slits 76b that are not covered by Teflon tape 74.

In addition, by also providing space 78 between pieces of Teflon tape 74 and the slits corresponding to the contact portions between partition walls and partition wall reinforcing portions, a die body can be similarly obtained in which slit width gradually becomes smaller.

Incidentally, in this processing method, surface treatment that includes the boundary between the outer reinforcing cells and inner cells is performed first, followed by surface treatment that includes the boundary between the peripheral wall and peripheral cells.

In addition, in order to make the surface roughness of the surface treated layer equal to the surface roughness of the metal underneath, it is preferable to uniformly pass abrasive clay through each slit throughout the die body after completion of surface treatment.

In addition, although Teflon tape is used for the mask in the above-mentioned embodiment, the mask is not limited to Teflon tape in the above-mentioned embodiment, and for example, polypropylene-based or vinyl chloride-based tape may also be used.

Furthermore, the first of the above-mentioned two methods requires a long time for finishing but results in a long mold life, thereby making it suitable for high-volume, mass production. The second method, on the other hand, allows the die body to be fabricated in a short time even though the resulting mold has a short die body life, thereby making it suitable for low-volume, trial production.

As has been described above, the present invention makes it possible to obtain a honeycomb structure that can adequately inhibit the occurrence of edge chipping even though the partition walls are extremely thin.

Although the flow paths used in the honeycomb structures had square cross-sections, the cross-sectional shape of the flow paths in the present invention are not limited to a square cross-sectional shape.

We claim:

1. A ceramic honeycomb structure comprising partition walls that form mutually adjacent flow paths having a polygonal cross-section, and a peripheral wall provided around the outermost circumferences of said partition walls that hold said partition walls integrated into a single unit; wherein, the mean thickness of said partition walls is 0.05 mm to 0.13 mm, the mean thickness of said peripheral wall is greater than the mean thickness T (mm) of said partition walls, and the relationship between mean partition wall thickness T and the mean contact width w (mm) between said partition walls and said peripheral wall satisfies the relationship of w>T and $0.7 \geq w \geq -(T/4)+0.18$.

2. A ceramic honeycomb structure as set forth in claim 1 wherein rounded corners are formed in said partition walls at the junctions of said partition walls and said peripheral wall.

3. A ceramic honeycomb structure as set forth in claim 2 wherein the mean radius of said rounded corners is 0.06 to 0.30 mm.

4. A ceramic honeycomb structure as set forth in claim 1 wherein the porosity of said honeycomb structure is 30% or more.

5. A ceramic honeycomb structure as set forth in claim 1 which has partition wall reinforcing portions, having a mean thickness of 0.1 to 0.3 mm and forming mutually adjacent flow paths having a polygonal cross-section, at the region extending in the direction toward the center of said ceramic honeycomb structure from said peripheral wall by 1.2% to 15% of the distance from said peripheral wall to the center of said ceramic honeycomb structure.

6. A ceramic honeycomb structure as set forth in claim 5 wherein tapered portions are formed at the boundary regions of said partition walls and said partition wall reinforcing portions.

7. A ceramic honeycomb structure as set forth in claim 6 wherein said tapered portions are of a length equal to the width of a single flow path.

8. A ceramic honeycomb structure as set forth in claim 6 wherein said tapered portions are of a length equal to the width of a plurality of flow paths.

9. A ceramic honeycomb structure as set forth in claim 5 wherein rounded corners are formed between said peripheral wall and said partition wall reinforcing portions.

10. A ceramic honeycomb structure as set forth in claim 9 wherein the mean radius of said rounded corners is 0.06 to 0.30 mm.

11. A ceramic honeycomb structure as set forth in claim 5 wherein the porosity of said honeycomb structure is 30% or more.

12. A ceramic honeycomb structure as set forth in claim 5 wherein said honeycomb structure has a roughly circular shape of the cross-section in a direction perpendicular to the direction of the flow paths and a roughly uniform width of the region of said partition wall reinforcing portions from said peripheral wall over its entire circumference.

13. A ceramic honeycomb structure as set forth in claims 1 wherein the thickness of the partition wall of said ceramic structure is 1.1 mm or less.

14. A ceramic honeycomb structure as set forth in claim 1 wherein said honeycomb structure has a roughly circular shape of the cross-section in a direction perpendicular to the direction of the flow paths and a roughly uniform width of the region of said partition wall reinforcing portions from said peripheral wall over its entire circumference.

15. A method of manufacturing a ceramic honeycomb structure having a plurality of partition walls and a peripheral wall surrounding and connected to the partition walls, comprising the steps of: forming initial slits having a width smaller than a predetermined width in a die body; passing an abrasive through said initial slits while a mask is gradually shifted from a portion of the die body constructed to form the peripheral wall of the ceramic honeycomb structure toward a center of slits in the die body constructed to form junctions between said peripheral wall and said partition walls, to form rounded portions at said junctions between said peripheral wall and said partition walls; and extruding, through said slits of the resultant die body, the ceramic honeycomb structure.

16. A method of manufacturing a ceramic honeycomb structure having a plurality of partition walls and a peripheral wall surrounding and connected to the partition walls, comprising the steps of: forming initial slits having a width smaller than a predetermined width in a die body; passing an abrasive through said initial slits while a mask is gradually shifted from a portion of the die body constructed to form the peripheral wall of the ceramic honeycomb structure toward a center of slits in the die body, to form slits having desired tapered widths portions in boundary regions between portions of the die body constructed to form partition wall reinforcing portions of the honeycomb structure and said partition walls; and extruding, through said slits of the resultant die body, the ceramic honeycomb structure.

17. A method for manufacturing a ceramic honeycomb structure, having a plurality of partition walls and a peripheral wall surrounding and connected to the partition walls, comprising the steps of: forming initial slits having a width larger than a predetermined width in a die body; passing a plating solution through said initial slits of said die body while a space is provided between a mask and a portion of said initial slits corresponding to at least junctions between said peripheral wall and said partition walls, to form a plating layer on a surface of said initial slits, thereby forming desired widths of said slits and, in a portion of the slits between which and said mask a space is provided, slits having gradually varied widths; and extruding, through the resultant die body, the ceramic honeycomb structure.

18. A method for manufacturing a ceramic honeycomb structure, having a plurality of partition walls and a peripheral wall surrounding and connected to the partition walls, comprising the steps of: forming initial slits having a width larger than a predetermined width in a die body; passing a plating solution through said initial slits while a space is provided between a mask and a portion of said initial slits corresponding to at least boundary regions between said peripheral wall and said partition walls, to form a plating layer on a surface of said initial slits, thereby forming desired widths of said slits and, in a portion of said slits between which and said mask a space is provided, slits having gradually varied widths; and extruding, through the resultant die body, the ceramic honeycomb structure.

* * * * *